3 Sheets—Sheet 1.

C. JEWELL,

Assignor, by mesne assignments, to THE McCORMICK HARVESTING MACHINE COMPANY.

Grain Binder.

No. 9,717.

Reissued May 24, 1881.

Attest:
H. L. Perrine
Dan'l Kelly.

Inventor.
Charles Jewell
By. Pancoast & Pancoast Attorneys

C. JEWELL,

3 Sheets—Sheet 2.

Assignor, by mesne assignments, to THE McCORMICK HARVESTING MACHINE COMPANY.

Grain Binder.

No. 9,717.

Reissued May 24, 1881.

Attest:
H. L. Pennie
Dan'l Kelly.

Inventor:
Charles Jewell
By. Parkinson & Parkinson
Attorneys.

3 Sheets—Sheet 3.

C. JEWELL,

Assignor, by mesne assignments, to THE McCORMICK HARVESTING MACHINE COMPANY.

Grain Binder.

No. 9,717.

Reissued May 24, 1881.

Attest:
H. C. Perrine
Dan'l Kelly.

Inventor:
Charles Jewell
By Pancoast & Pancoast
Attorneys

UNITED STATES PATENT OFFICE.

CHARLES JEWELL, OF MONMOUTH, ASSIGNOR, BY MESNE ASSIGNMENTS, TO THE McCORMICK HARVESTING MACHINE COMPANY, OF CHICAGO, ILLINOIS.

GRAIN-BINDER.

SPECIFICATION forming part of Reissued Letters Patent No. 9,717, dated May 24, 1881.

Original No. 150,050, dated April 21, 1874. Application for reissue filed November 29, 1880.

*To all whom it may concern:*

Be it known that I, CHARLES JEWELL, of Monmouth, in the county of Warren and State of Illinois, have invented certain new and useful Improvements in Grain-Binders, of which the following is a specification.

My invention relates to automatic binding mechanism adapted to receive the grain in gavels from the platform of a reaper and compress and bind it into sheaves; and it consists in improved means for compressing and shaping the gavel, in improved knotting mechanism for uniting the ends of a cord-band, in a movable cord-holder which yields toward the knotter to give up slack as the latter revolves, and in the various combinations and details of construction hereinafter described and claimed.

Figure 1:
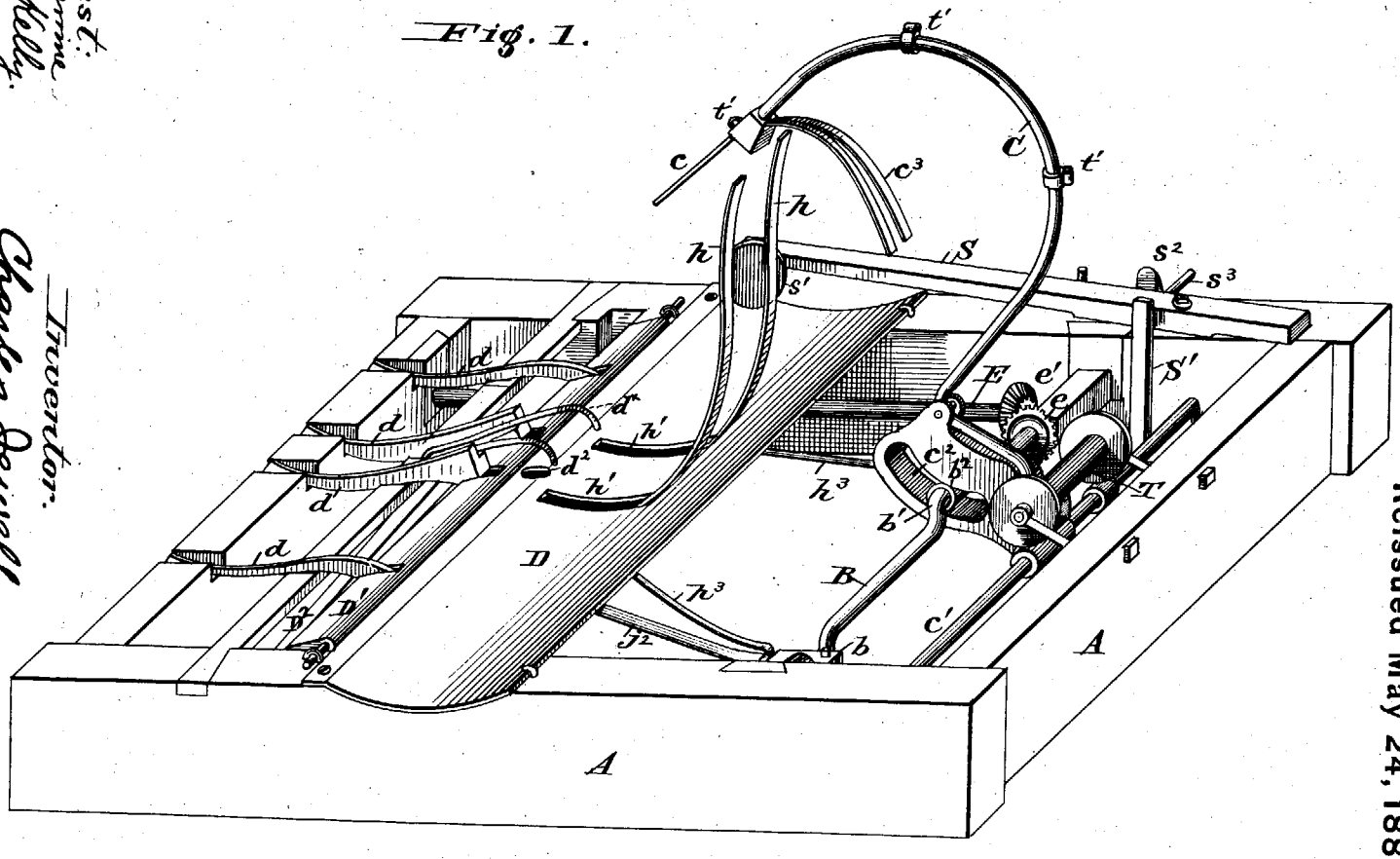
Figure 2:
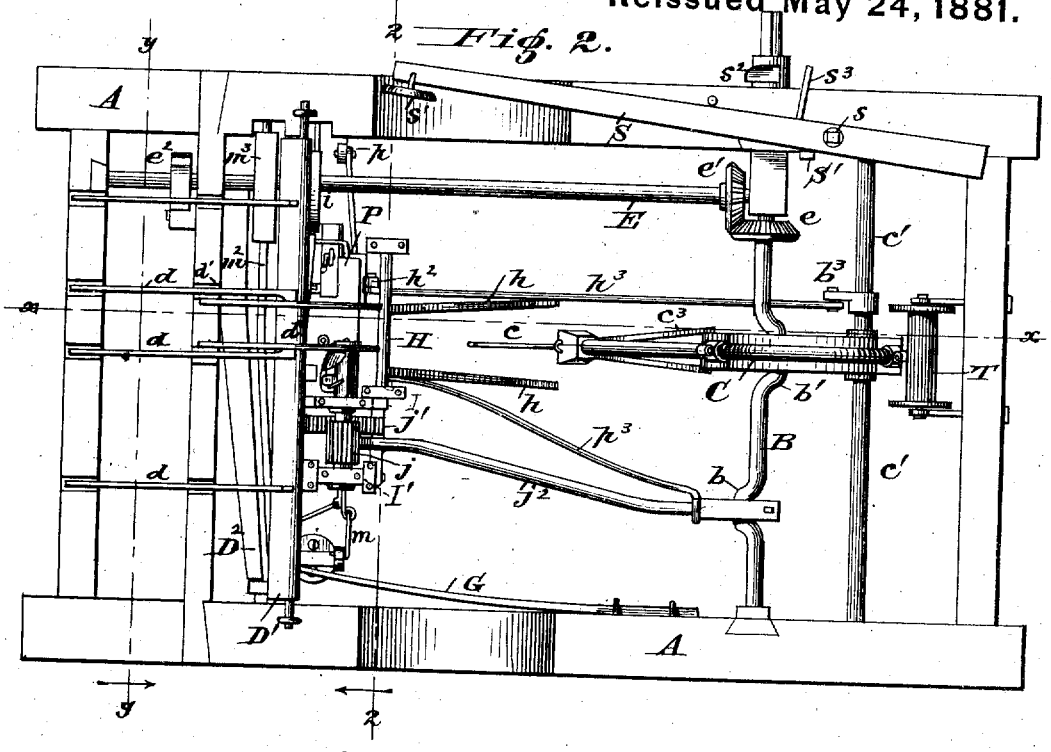
Figure 3:
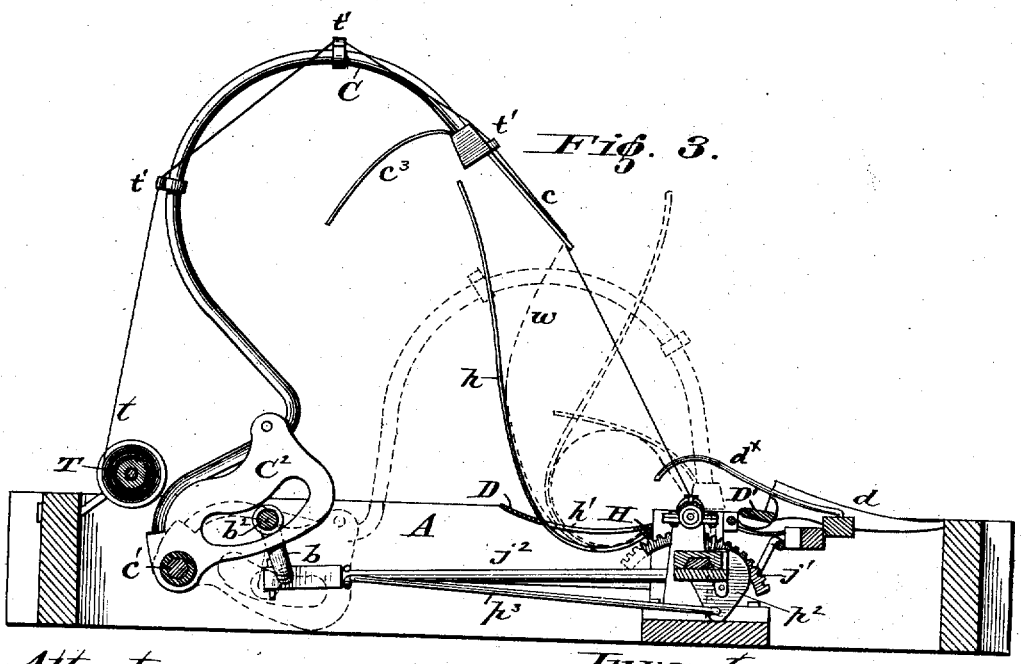
Figure 4:
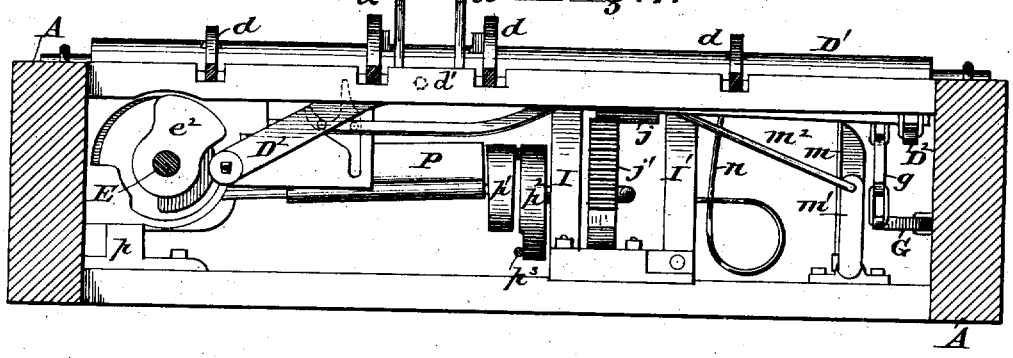
Figure 5:
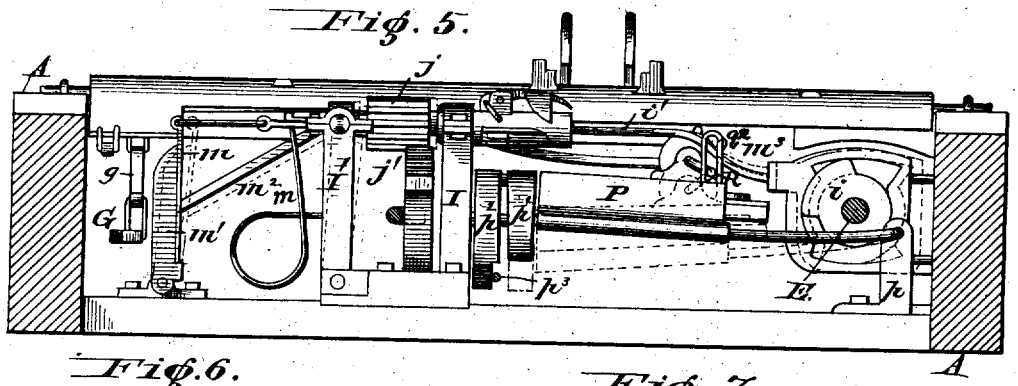
Figure 6:
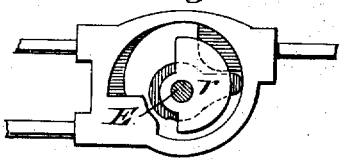
Figure 7:
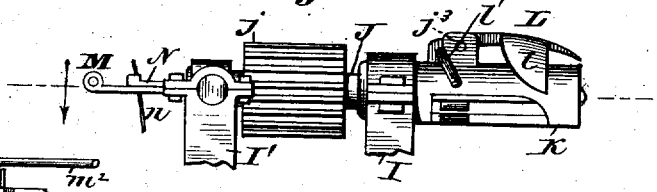
Figure 9:
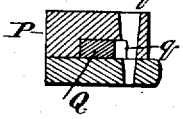
Figure 9:
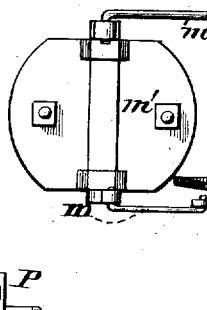
Figure 8:
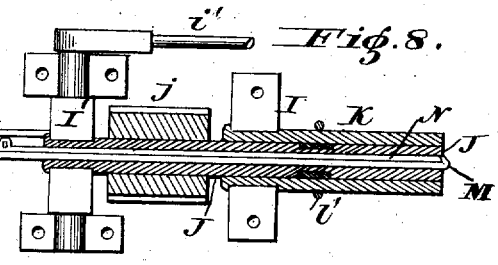
Figure 10:
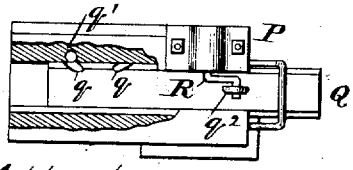
Figure 11:
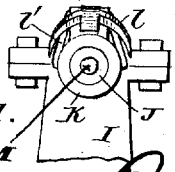

In the drawings, Figure 1 is a perspective view of a machine embodying my invention. Fig. 2 is a top-plan view thereof with the grain-receptacle removed. Fig. 3 is a vertical section on the line *x x* of Fig. 2. Fig. 4 is a vertical section on the line *y y* of Fig. 2, looking to the right. Fig. 5 is a vertical section on the line 2 2 of Fig. 2, looking to the left. Fig. 6, a detail of the actuating mechanism; Fig. 7, a side elevation, and Fig. 8 a horizontal section, of the knotter and its bearings; Fig. 9, a cross-section, and Fig. 10 a top-plan view, with parts broken away, of the cord holder and cutter; Fig. 11, an end view of the knotter.

A represents the frame carrying the working devices. It may be attached to the harvester in any suitable manner, and may be supported and carried on any suitable slides or wheels.

B is the main driving-shaft, provided with two cranks, *b b'*, and receiving motion by band or gear wheel from the harvester.

C is the binding-arm, carrying the needle *c* in its free end, and secured at the other end to a shaft, *c'*. In the enlarged shank of this binding-arm, near to its pivot, is a curved slot, $c^2$, in which the crank *b'* and its anti-friction-wheel $b^2$ work as the main shaft revolves, thereby causing the intermittent vibrations necessary to the binding operation, and near its point it has arms or spurs $c^3$, which, as it falls, sit over and compress the gavel. The shape of the slot $c^2$, as shown, is such as to involve a period when the arm is down, during which the course of the crank substantially coincides with the curve of the slot, and the arm is held in position to permit the knotting and holding devices to act. On the other hand, the crank, in its continued motion to lift the arm, travels along the convex side of the slot, and thereby accelerates the rise of said arm.

D is the grain-receptacle, in which the gavel is received to be operated upon.

Just beyond the grain-receptacle, and between it and that end of the frame adjoining the harvester, is a rock-shaft, D', having suitable journal-bearings in the side frame-pieces at each end of the receptacle, and provided with fingers *d d*, which bridge the space between it and the delivery-point of said harvester and form a cradle to receive grain from the latter. A lever, $D^2$, pivoted near its middle, $d^5$, to one of the transverse frame-pieces, is connected at one end by a stirrup-coupling to one side and end of the rock-shaft. A shaft, E, suitably journaled and driven in proper time from the main shaft B by means of intermeshing bevel-gears *e* and *e'*, is provided near its farther end with a cam or wiper, $e^2$, which, at each revolution of the shaft and after each binding operation, impinges on the free end of the lever $D^2$ and presses it down, thereby throwing the cradle up to deliver a fresh gavel to the receptacle. When the wiper passes off of the end of the lever the cradle is returned to its normal position by means of a spring, G, connected at one end to one of the side frame-pieces, and at its other end, by means of a link, *g*, to one side of the rock-shaft, and acting in opposition to the lever.

As the grain passes into the receptacle it rides over raised guards $d^x$, one on each side of the throat or opening $d^2$, through which the needle carries the cord to the securing devices beneath, and is thereby lifted away from the opening to keep it clear. At their ends, just beyond the opening, the guards are bent down abruptly to prevent the bundle from being pushed back by the wire in the descent of the binding-arm, and obviate the risk of fragments of straw being carried into the throat and mechanism below along with the needle.

In brackets or hangers beneath the grain-receptacle or binding-table is journaled a rock-shaft, H, from which curved fingers $h$ project upwardly through slots $h'$ in said table. A crank, $h^2$, on the rock-shaft H is connected by means of the rod $h^3$ with a crank, $b^3$, on the shaft $c'$, and as the latter is rocked by the ascent or descent of the binding-arm the fingers will be by turns thrown back to enlarge the grain-space and closed in to compress the gavel. The position of binding-arm and fingers $h$ when in readiness for the reception of the gavel in the grain-receptacle is shown in full lines in Fig. 3, and the cradle in its normal position also in full lines. The next action of the machine throws the cradle up to deliver a gavel, when the binding-arm falls to the position represented in dotted lines, and the compressing-fingers simultaneously move in toward it, so that the gavel is compressed on all sides and shaped between the receptacle, the binding-arm and its spurs, and said fingers. As soon as the ends of the band have been secured the binding-arm rises, the compressing-fingers open, the bound sheaf is ejected, and the machine is ready for the reception of a fresh gavel.

Below the grain-receptacle are standards I I′ supporting the knot-tying devices, the standard I being stationary, and the standard I′ pivoted at its base to allow an oscillating movement toward and from the former, which movement is produced by a cam, $i$, on the shaft E, the yoke of which is connected with the standard by a rod, $i'$. Supported and turning in these standards is a hollow shaft, J, having collars on each side of its bearing in the standard I′, so that it will be reciprocated by the oscillations thereof. A pinion, $j$, is keyed to the shaft J and gears with a segment, $j'$, by which it and the shaft on which it is mounted are given an intermittent rotary motion, the segment itself being actuated through the connecting-rod $j^2$ from the crank $b$ on the main shaft.

On the projecting end of the hollow shaft or tube J is a sleeve, K, enlarged on each side of a bearing in the fixed standard I to prevent longitudinal movement, and slotted on its opposite sides in the direction of its axis to permit the passage of the arm $j^3$, by which it is keyed to the tube J, to revolve therewith.

A jaw or catch, L, formed, as shown in Fig. 7, with a hooked outer end and with side arms $l$, is pivoted near its central part to the arm $j^3$, and at its heel end is connected by means of a stirrup or link, $l'$, with the sleeve K, so that when the tube J is reciprocated through said sleeve the hook L or its outer end will be alternately pressed to and from the outer end of the tube.

Through the tube passes a bar, M, provided with a hook at its outer end, and connected at its inner end by a spring-bar, $m$, with a vibrating frame, $m'$, which is actuated by means of a rod, $m^2$, extending to the yoke about the cam $m^3$ on the shaft E. Alongside the hooked bar rests another bar, N, shouldered and connected at its rear end to a spring, $n$, in such manner that when the bar M is retracted the end of the bar N will press against the hook, and when the bar M is projected the contact of the shoulder with the rear end of the tube will cause it to be opened away from said hook.

In the knotting operation the strands of cord are held between the side of the tube and the inner face of the catch or finger L, and in the revolution of the tube the portions leading to the gavel are first struck and carried around by the finger to form the loop, and deflected by its curved or sloping outer surface so as to slip or spring over its end and the end of the tube and cross the portions leading to the holder, which are next struck by said finger, and in like manner advanced and deflected to be caught in the hooked bar or rod at this moment projecting from the tube. The movements of the knotter take place in such order and in such relation to the delivery of the gavel and action of the binding-arm that the tube is first projected and the two strands of cord from the band portion in succession laid against the side of the tube. Then the jaw or catch comes down and confines them. Next a revolution is made to form the loop, the hooked bar projected to catch the ends crossed over said loop and retracted to clamp them against its yielding counterpart and draw them within the tube, the tube itself retracted and the jaw simultaneously opened, so that the loop is pushed off by the sleeve and tightened upon the strand to complete the knot, and, finally, the hooked rod again projected to release the ends in time for the action of the ejecting mechanism. The knot that is formed is a common loop-knot.

P is the device for holding the cord while the knot is being tied and for severing it and taking a fresh hold at the completion of the tying operation. It is located below the knotter, and its main frame is suspended or attached by arms to standards $p$ in such manner as to allow it to be oscillated or raised and lowered to yield up slack as the knotter takes up cord in the tying operation, and to return to its normal position with the new end of the cord after the band portion has been severed. The free end of the holder-frame is connected by a swinging arm, $p'$, with a crank-plate, $p^2$, which is, in turn, connected by a rod, $p^3$, to the crank $b$ on the main shaft, for the purpose of giving it positively the rising-and-falling motion. A slide, Q, is arranged within this frame so as to have a longitudinal reciprocating movement therein. At one side of the slide are diagonal slots $q$ $q$ flaring away from each other, and located in such manner and relation that at the end of each stroke the hindmost one is brought to and rests in line with the aperture $q'$ in the holder-frame P, through which the needle passes with the cord, and in the return-stroke its flaring side gathers in the strand leading from the point of the needle to the just-formed knot and severs it, and also the old strand previously clamped and stretched alongside thereof against the overlying sharpened edge of the aperture, and clamps the new end against the plate beneath. The binder-arm rises after the stroke is ended and the plate again at rest so as to lay the strand running from the newly-clamped end to its eye in the same slot, which it reaches in its next descent. Thus there is but one lengthwise movement of the plate to each complete binding operation. The slide is operated by means of a yoke or staple, $q^2$, projecting upwardly therefrom through a slot in the holder-frame, in which works a crank, R, moving at such intervals as to project the slide as the needle descends once and retract it as it descends again. This crank receives the proper intermittent motion from a crank-wheel in which two pins work which are attached to a plate that, in turn, is connected to and receives motion from a cam, *r*, on the shaft E.

A lever, S, is pivoted on the main frame of the binder at *s* in such manner as to bring one end, carrying a disk, *s'*, over the grain-receptacle at the butt-end of the gavel. This lever is held in its normal position out of action by means of a spring, S', but once in each revolution of the shaft B is moved forward to eject the bound gavel by the action of a wiper or tappet, $s^2$, on said shaft, which strikes a laterally-projecting pin, $s^3$, on the lever.

The binding-cord *t* is carried on a spool, T, and passes therefrom through loops *t'* on the binding-arm, down through an eye in the point of the needle, and thence to the cord-holder, where its end is clamped and held.

The mechanism and cord being now in the position shown in full lines in Fig. 3, it will be seen that if the gavel is thrown into the grain-receptacle the cord will yield before it to the position indicated by dotted lines *w*, when the binding-arm, descending, will carry the spool-portion over and about the gavel, down alongside the old end, against the side of the projecting knotting-tube, and through the aperture in the holder-frame, past and opposite one of the diagonal slots in the side Q by which it is first clamped and then cut, and the new end firmly retained, the knot being tied just before the cord is cut, and the holder yielding bodily during the knotting operation to render up slack, as before stated. When the gavel has thus been bound and the cord severed the holder returns to its normal position with the new end of the cord in its grasp, the sheaf is ejected, and the machine is ready for a fresh gavel.

I claim as my invention—

1. In a grain-binder, the combination of a grain-receptacle, a binding-arm formed with spurs which sit over and compress the gavel against the floor of the receptacle as the arm descends, and compressing-arms acting in opposition to the binding-arm and its spurs to compress the gavel on the diameter parallel with the receptacle, whereby it is simultaneously compressed on all sides.

2. In a grain-binder, the combination of a grain-receptacle, compressing-arms at the outer side of said receptacle, against which the grain is thrown as it enters the receptacle, a binding-arm formed with spurs to sit over and press upon the gavel, and mechanism actuating the compressing-arms to move in against the gavel as the binding-arm falls, whereby it is compressed and shaped on all sides as the band is applied.

3. In a grain-binder, the combination of a grain-receptacle, compressing-arms projecting up at the outer side of the receptacle from a rock-shaft beneath and serving as stops to the grain as it is delivered, a binding-arm formed with spurs to sit over and press upon the gavel, and mechanism actuating the rock-shaft to move the compressing-arms in against the gavel as the binding-arm falls, whereby it is compressed and shaped on all sides at once.

4. In a grain-binder, the combination of a grain-receptacle, compressing-arms projecting up at the outer side of the receptacle from a rock-shaft beneath and serving as stops to the grain as it is delivered, a vibrating binding-arm overhanging the receptacle and formed with spurs to sit over and press upon the gavel, and mechanism actuating the rock-shaft to move the compressing-arms in against the gavel as the binding-arm descends upon it.

5. In a grain-binder, the combination of a grain-receptacle, compressing-arms projecting up at the outer side of the receptacle from a rock-shaft beneath and serving as stops to the grain as it is delivered, a binding-arm formed with spurs to sit over and press upon the gavel, and mechanism actuating the rock-shaft to move the compressing-arms in against the gavel as the binding-arm falls in order to simultaneously compress it on all sides and open them away therefrom as the binding-arm rises to permit the discharge of the bound sheaf.

6. In a grain-binder, the combination of the grain-receptacle, the compressing-arms projecting up at the outer side of the receptacle from the rock-shaft beneath, the segment whereby said shaft is rocked, and the binding-arm formed with spurs which coact with the receptacle and compressing-arms to compress and shape the gavel on all sides at once.

7. In a cord-knotter, the combination of a tube around which the loop is formed, and a clasp or finger which closes upon the side of the tube to confine the strands of cord against it and wind them about it during the ensuing revolution.

8. In a cord-knotter, the combination of a tube around which the loop is formed, a clasp or finger which closes upon the side of the tube to confine the strands of cord thereagainst and wind them thereabout during the ensuing revolution, and a hooked rod reciprocating through the tube whereby the ends of the cord are caught and drawn within after being crossed over the loop.

9. In a cord-knotter, the combination of a tube around which the loop is formed, a clasp or finger which closes upon the side of the tube to confine the strands thereagainst during the ensuing revolution, a hooked rod reciprocating through the tube to catch the ends of the cord and draw them through the loop, and a converse rod whereby said ends are clamped against the hook after being caught.

10. In a cord-knotter, the combination of a tube around which the loop is formed, a hooked rod reciprocating through the tube to catch the ends of the cord and draw them through the loop, and a converse rod acting against the hook with an elastic pressure to clamp said ends after they have been caught.

11. In a cord-knotter, the combination of a tube around which the loop is formed, a clasp or finger which closes upon the side of the tube to confine the strands of cord as it revolves, a hooked rod reciprocating through the tube to catch the ends of the cord and draw them through the loop, and a converse rod acting against the hook with an elastic pressure to clamp said ends after they have been caught.

12. In a cord-knotter, the combination of a tube around which the loop is formed, a sleeve through which the tube reciprocates, and a clasp or finger borne upon said tube, the point of which comes in contact with the side of the tube as the latter is projected beyond the sleeve to confine the strands of cord against said tube as it revolves.

13. In a cord-knotter, the combination of a tube around which the loop is formed, an external clasp or finger which closes upon the side of the tube to confine the strands of cord thereagainst during the ensuing revolution, and a sleeve upon said tube acting to operate the clasp or finger and push the loop toward the end of the tube as the latter moves endwise relatively to said sleeve.

14. In a cord-knotter, the combination of a tube around which the loop is formed, an external clasp or finger which closes upon the side of the tube to confine the strands of cord thereagainst during the ensuing revolution, and a sleeve acting to operate said clasp or finger.

15. In a grain-binder, the combination, with the knot-tying device, of an independent cord-holder which moves toward said device during the tying operation to yield up slack.

16. In a grain-binder, the combination, with the knotting mechanism, of a cord-holder which moves toward said mechanism during the tying operation to yield up slack and at the conclusion thereof releases the ends of the band portion and returns to its normal position with the new end of the cord.

17. In a grain-binder, the combination, with the knotter, of a cord-holder and mechanism actuating it to move it positively toward said knotter during the tying operation to render up slack for the formation of the knot.

18. In a grain-binder, the combination, with the knotter, of a cord-holder and cutter arranged to move bodily toward the knotter during the tying operation to render up slack, and then actuated to sever and release the ends of the band portion and seize the end of the spool portion, with which they return to their normal position.

19. In a grain-binder, the combination, with the knotter, of a frame bearing the cord holder and cutter, and pivoted at the heel end, whereby it may be swung toward the knotter during the tying operation to render up slack from that portion of the cord extending between the knotter and holder.

20. In a grain-binder, the combination, with the knotter, of a frame bearing the cord holder and cutter, and pivoted at its heel end, and mechanism rocking said frame positively upon its pivot to move it toward the knotter during the tying operation and to return it to its normal position immediately after.

21. In a grain-binder, the combination, with the knotter, of a frame bearing the cord holder and cutter, pivoted at its heel end and supported by a link at the other end, and a crank to which said link is attached, whereby the frame is moved toward the knotter during the tying operation and away therefrom immediately after said operation.

22 The combination, with the tube J, of the hooked rod M, reciprocating therethrough, and the rod N, shouldered at its heel end to limit its forward movement, and pressed toward the hook by a spring, whereby the ends of the cord may be caught by the hook and drawn back and clamped against the end of the rod N substantially as described.

23. In combination with the hollow shaft J, sleeve K, and hooked rod M, the catch or finger L, having the curved or sloping outer surface, whereby the strands of cord are deflected in the revolution of the tube, substantially as described.

24. The hollow shaft J, sleeve K, catch L, hooked rod M, and rod N, arranged and combined substantially as described, and for the purpose specified.

25. The hollow shaft J, sleeve K, catch L, hooked rod M, and rod N, combined with the frame P, containing the holding mechanism, and with the needle *c*, substantially as described and for the purpose specified.

26. In a cord-holder, the combination, with an apertured frame or block through which the cord is carried by the needle, of a slide intermittently reciprocating therein, and having two cord-receiving slots, each of which, in turn, is caused to match with the aperture to receive the cord from the needle and then move past it to sever the strands leading to the knot and clamp the new end.

27. The cord-holder consisting of the frame or block P, having an eye or perforation through which the needle carries the band material, and the slide Q, reciprocating therein and having two diverging edge slots, each of which, in turn, receives an end of the cord, substantially as described.

28. The slide Q, constructed as described, with its diagonal slots, in combination with the perforated frame P and needle *c*, substantially as described, and for the purpose set forth.

29. The combination of the shafts B and *c'*, connecting-rod $j^2$, segmental gear $j'$, and pinion *j* with the binder-arm C and tying and cutting devices, substantially as described.

CHARLES JEWELL.

Witnesses:
W. J. VAN HOESEN,
C. E. BLACKBURN.